United States Patent [19]

Uematsu

[11] Patent Number: 5,156,468
[45] Date of Patent: Oct. 20, 1992

[54] PATTERN DUPLICATION IN LABEL PRINTER'S MEMORY

[75] Inventor: Kaoru Uematsu, Shizuoka, Japan

[73] Assignee: Tokyo Electric Co., Ltd., Tokyo, Japan

[21] Appl. No.: 595,263

[22] Filed: Oct. 9, 1990

[30] Foreign Application Priority Data

Oct. 13, 1989 [JP] Japan .................... 1-265239

[51] Int. Cl.[5] .................................. B41J 5/30
[52] U.S. Cl. ............................ 400/68; 400/61; 395/116
[58] Field of Search ............ 400/61, 68, 70, 76, 400/121; 395/116, 149

[56] References Cited

U.S. PATENT DOCUMENTS

| | | | |
|---|---|---|---|
| 4,651,288 | 3/1987 | Zeising | 400/76 |
| 4,780,008 | 10/1988 | Ueno et al. | 400/63 |
| 4,862,194 | 8/1989 | Uematsu | 400/121 |
| 4,939,669 | 7/1990 | Nishino | 400/76 |
| 4,943,936 | 7/1990 | Hirai | 400/76 |

FOREIGN PATENT DOCUMENTS

| | | | |
|---|---|---|---|
| 0297567 | 1/1989 | European Pat. Off. | 400/68 |
| 3247291 | 6/1984 | Fed. Rep. of Germany | 400/68 |
| 71081 | 5/1982 | Japan | 400/68 |
| 64765 | 3/1988 | Japan | 400/121 |

*Primary Examiner*—David A. Wiecking
*Assistant Examiner*—Steven S. Kelley
*Attorney, Agent, or Firm*—Frishauf, Holtz, Goodman & Woodward

[57] ABSTRACT

A label printer comprises a frame memory for storing a printing pattern for a label to be printed, and a printer unit for printing a label in accordance with the printing pattern stored in the frame memory. The label printer further comprises a control unit for partitioning the frame memory in accordance with a designated size of the label, thereby providing at least one print buffer, for producing a printing pattern for one label in the printing bufer, and for supplying the printing pattern stored in the print buffer to the printer unit, wherein the control unit includes a modifying section, and, when a plurality of print buffers are provided in the frame memory, the modifying section transfers the printing pattern produced in one of the print buffers into a remaining print buffer and modifies the printing pattern stored in the remaining print buffer to produce another printing pattern.

16 Claims, 7 Drawing Sheets

FIG. 4A  LABEL SIZE SETTING COMMAND

`#BD0800#M#BE0020#M#C`

- `#BD0800#M`: DISTANCE BETWEEN FRONT EDGES OF TWO SUCCESSIVE LABELS
- `#BE0020#M#C`: DISTANCE BETWEEN REAR EDGE OF FIRST LABEL AND FRONT EDGE OF SECOND LABEL

FIG. 4B  FEED COMMAND

`#BT20C20#M#C`

- SELECTION DATA FOR FEED CONTROL SENSORS
- PAPER CUT CONTROL DATA
- CONTROL DATA FOR USE OF INK RIBBON
- FEED SPEED DATA
- DATA FOR SELECTING CONTINUOUS ISSUE ON PEELING ISSUE

FIG. 4C  FORMAT COMMAND

`#BPC00;0240,0350,1,1,A,22,B#M`

- `#BPC00`: ID NUMBER FOR CHARACTER STRING
- `0240`: X-COORDINATE DATA
- `0350`: Y-COORDINATE DATA
- `1,1`: MAGNIFICATION DATA FOR HEIGHT AND WIDTH
- `A`: DATA FOR ROTATING CHARACTER AND CHARACTER STRING
- `22`: CHARACTER STYLE DATA
- `B`: BACKGROUND COLOR DATA

FIG. 4D  LABEL DATA COMMAND

`#BRC00;54-20-64#M`

- `#BRC00`: ID NUMBER FOR CHARACTER STRING
- `54-20-64`: PRINT DATA

PATTERN DUPLICATION IN LABEL PRINTER'S MEMORY

BACKGROUND OF THE INVENTION

1. Field of the Invention

This invention relates to a label printer which issues various labels, and more particularly, to a label printer for sequentially issuing labels having partly different contents.

2. Description of the Related Art

Many retail shops uses printed labels containing information pertaining to articles, such as, name of article and price, for affixing on articles such as foodstuffs and other daily sundries. Such information is printed on a label in characters, a bar code and the like.

A conventional label printer is provided with a frame memory to store a printing pattern for a label to be printed. Such a label printer allocates in the frame memory a print buffer having a storage capacity corresponding to a designated size of the label, converts print data for one label into character and bar code patterns by using a pattern generator, and store these patterns in the print buffer according to the printing format. After all character and bar code patterns have been set in the print buffer, a label is printed in accordance with a printing pattern constituted by the above patterns.

According to the label printer, a single print buffer is allocated in the frame memory. Therefore, while a label is printed by using the printing pattern stored in the print buffer, it has not been possible to produce another printing pattern necessary for printing the next label. Also, much time has been needed in converting the print data for one label to character or bar code patterns. Accordingly, the start of printing the next label is delayed in proportion to the period of time required for producing the printing pattern thereof.

SUMMARY OF THE INVENTION

An object of this invention is to provide a label printer capable of issuing, in a short period of time, labels having printing contents that partly differ from each other.

This object may be achieved by a label printer which comprises a frame memory for storing a printing pattern for a label to be printed, a printing unit for printing a label in accordance with the printing pattern stored in the frame memory, and a control unit for partitioning the frame memory in accordance with a designated size of the label, thereby providing at least one print buffer, for producing a printing pattern for one label in the printing buffer, and for supplying the printing pattern stored in the print buffer to the printing unit, wherein the control unit includes a modifying section, and, when a plurality of print buffers are provided in the frame memory, the modifying section transfers the printing pattern produced in one of the print buffers to a remaining print buffer and modifies the printing pattern stored in the remaining print buffer to produce another printing pattern.

According to this label printer, the frame memory is partitioned in accordance with a designated size of the label. In a case where a plurality of print buffers are provided in the frame memory as a result of the partitioning, a first printing pattern is produced in one of the print buffers, and transferred to a remaining print buffer and modified to produce a second printing pattern. The first printing pattern stored in the remaining print buffer may be modified by the pattern produced from print data corresponding to a difference between the first and second printing patterns. Since print data identical to that for the first printing pattern is not required, the modification can be completed in a short period of time. Accordingly, printing of a preceding label may be done in parallel to producing of a printing pattern for a subsequent label. This makes it possible to considerably shorten the print preparatory period required for changing the label to be printed.

BRIEF DESCRIPTION OF THE DRAWINGS

Reference will now be made in detail to the presently preferred embodiment of the invention as illustrated in the accompanying drawings, in which like reference characters designate like or corresponding parts throughout the several drawings.

DETAILED DESCRIPTION OF THE PREFERRED EMBODIMENT

The label printer according to a first embodiment of the invention will be described with reference to FIG. 1 through FIG. 9.

Figure 1:
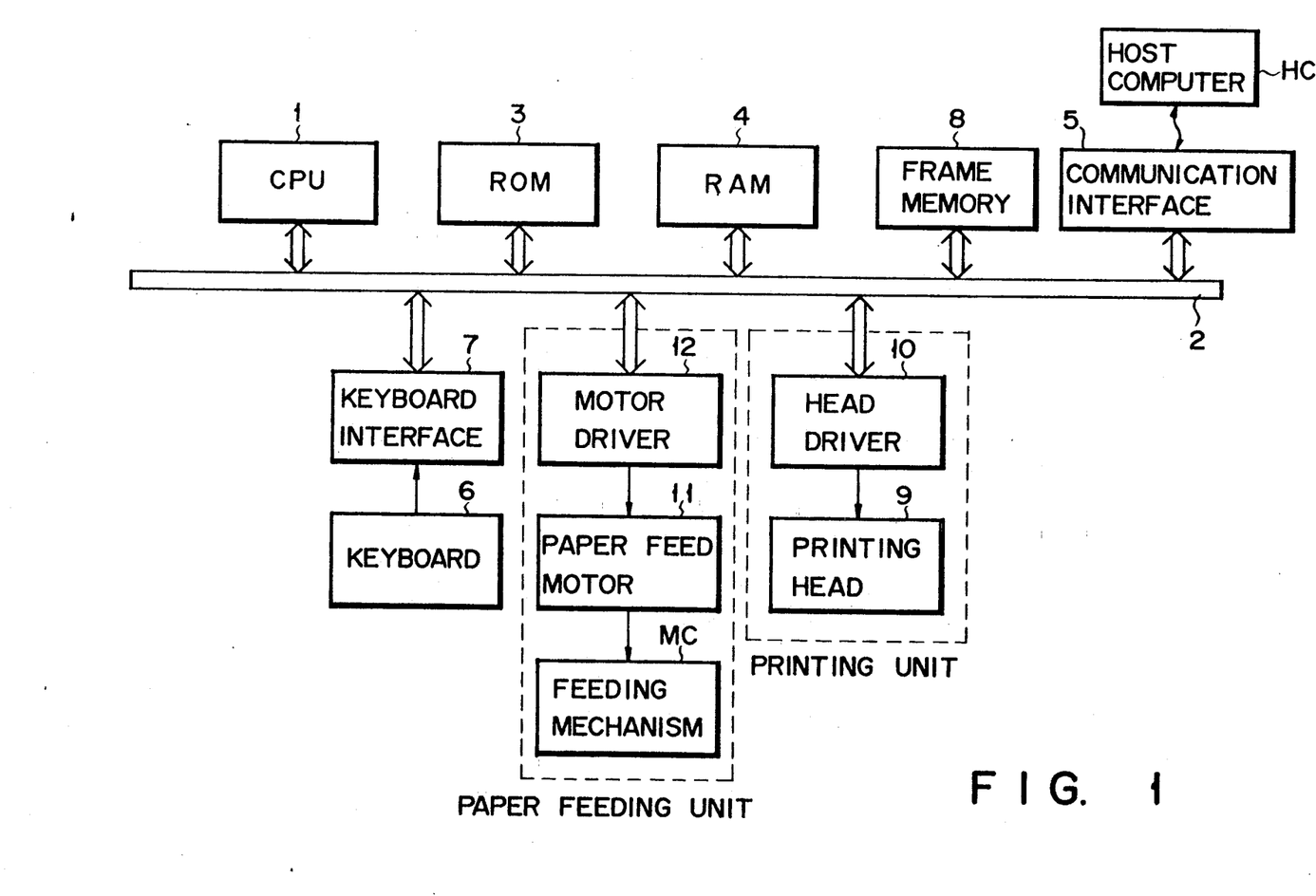
FIG. 1 shows the structure of a label printer embodying this invention.

FIG. 1 shows a circuit of the label printer which includes a CPU 1, a bus line 2, a ROM 3, a RAM 4, a frame memory 8, a communication interface 5, a paper feed motor 11, a motor driver 12, a dot printing head 9, a head driver 10, a keyboard 6, a keyboard interface 7, and a paper feeding mechanism MC. The CPU 1 is interconnected via the bus line 12 to the ROM 3, RAM 4, frame memory 8, communication interface 5, head driver 10 and the keyboard interface 24. The motor driver 12 is connected to the paper feed motor 11, the head driver 10 is connected to the dot printing head 9, the keyboard interface 7 is connected to the keyboard 6, the communication interface 5 is connected to external host computer HC, and the paper feed motor 11 is mechanically coupled to the paper feeding mechanism MC.

Figure 2:
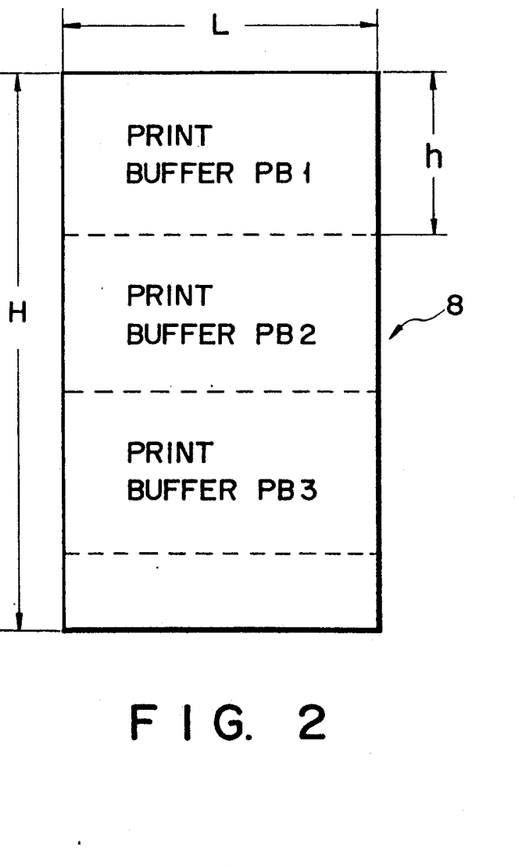
FIG. 2 is a view illustrating various memories accommodated in a RAM shown in FIG. 1.
Figure 3:
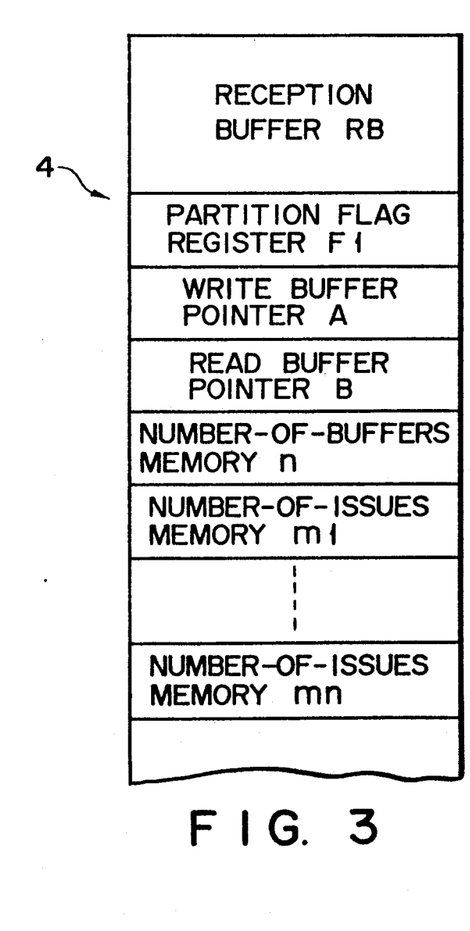
FIG. 3 shows a plurality of print buffers allocated in a frame memory shown in FIG. 1.
Figures 4A, 4B:
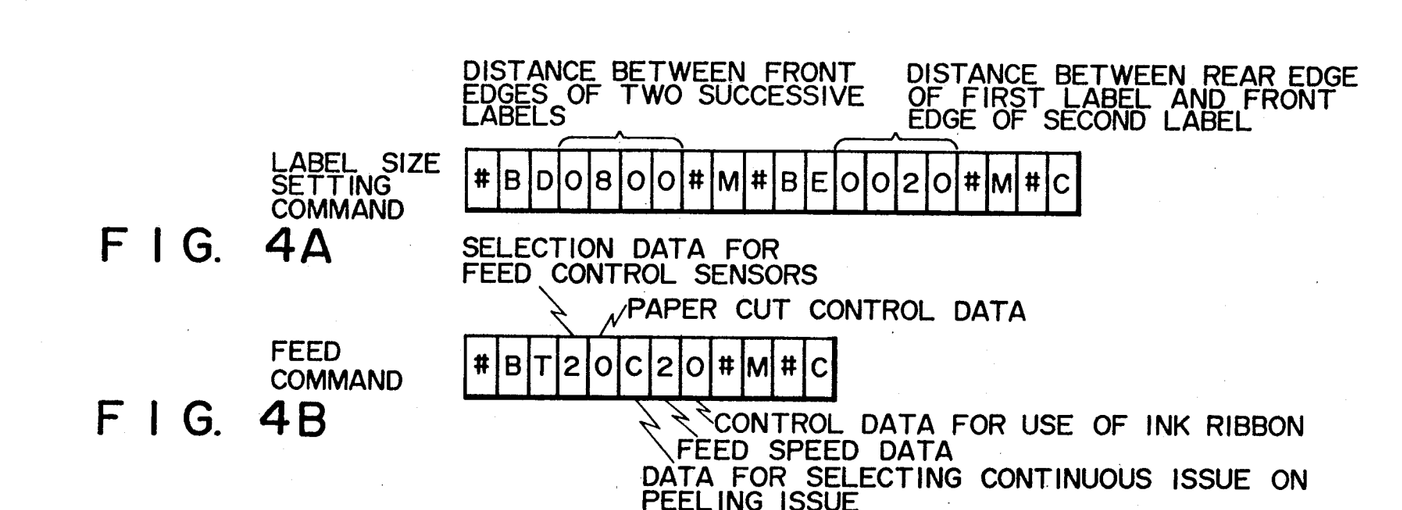
FIGS. 4A to 4D show examples of a command received through a communications interface shown in FIG. 1.
Figures 4C, 4D:
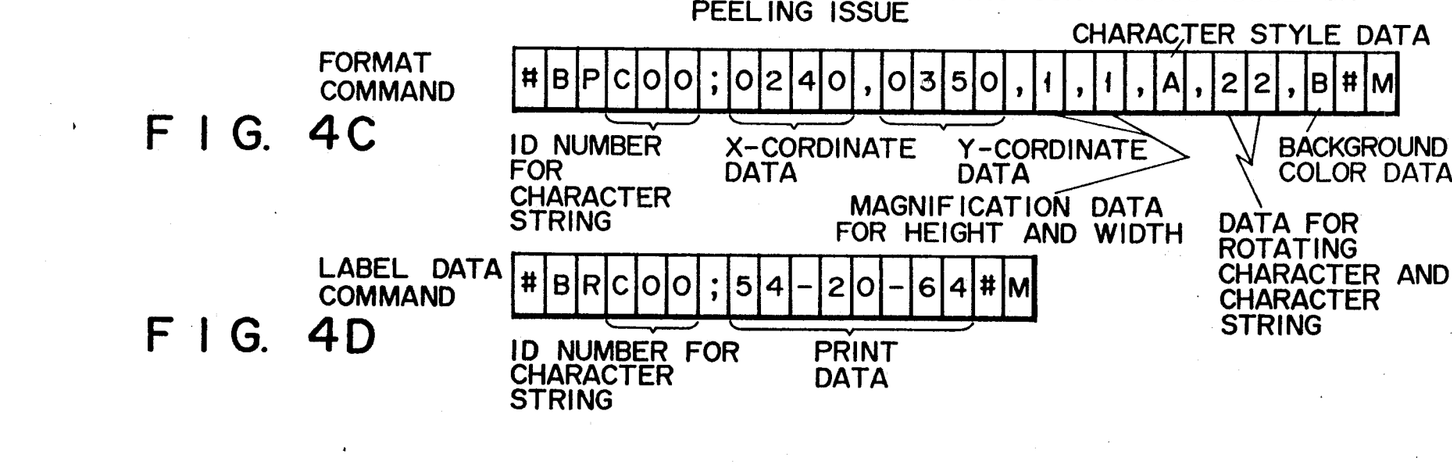

The CPU 1 analyzes various commands transmitted from the host computer HC, and performs various data processings and controls necessary for printing labels. The various commands include a label size setting command, a feed command, a format command and a label data command which are constituted as shown in FIGS. 4A to 4D, respectively. A control program for the CPU 1 and fixed data are stored in ROM 3. The ROM 3 includes a region which stores patterns of various characters (including alphanumeric indications) and bar codes and implements a pattern generator for generating patterns corresponding to print data contained in the label data command. Variable data transferred to and from the CPU 1 are temporarily stored in RAM 4, and a printing pattern for a label to be printed is stored in the frame memory 8. The frame memory is partitioned according to a size of the label or printing pattern designated by the label size setting command, so that at least one print buffer can be provided in the frame memory, and further provided as many as possible. Assuming that the frame memory 8 has storage capacity of [H×L] dots and the label is designated to have a size of [h×L] dots (h>H/2), a single print buffer is provided in the frame memory 8. FIG. 3 shows an example where three print buffers PB1 to PB3 are provided in the frame memory 8. These print buffers PB1 to PB3 are used for storing printing patterns different from each other As is shown in FIG. 2, the RAM 4 includes regions which respectively implement a reception buffer RB, a partition flag register F1, a write buffer pointer A, a read buffer pointer B, a number-of-buffers memory n and number-of-issues memories m1 to mn.

The memory n stores the number of print buffers provided in the frame memory 8. The number-of-issues memories m1 to mn are provided in correspondence with the number n of print buffers. For example, the memories m1, m2 and m3 are assigned to the print buffers PB1, PB2, and PB3, respectively. The reception buffer RB stores various command received by the communication interface 5. The partition flag register F1 is set to "1" when the frame memory 8 can be partitioned so as to provide two or more print buffers. The write buffer pointer A designates one of the print buffers as a buffer for use in writing, the read buffer pointer B designates one of the print buffers as a buffer for use in reading.

The keyboard 6 includes a power switch and various control keys such as a print start key, paper feed key, and the like. The keyboard interface 7 supplies key-in signals to the CPU 1 in response to the operations of the keyboard 6. The motor driver 12 drives paper feed motor 11 in printing process, and The paper feeding mechanism MC feeds a series of label paper attached to a base sheet, as the paper feed motor 11 rotates. The head driver 10 drives the printing head 9 according to the printing pattern read out from one of the print buffers accommodated in the frame memory 8 to print a label on the label paper.

The operation of the label printer will be described.

Figure 5A:
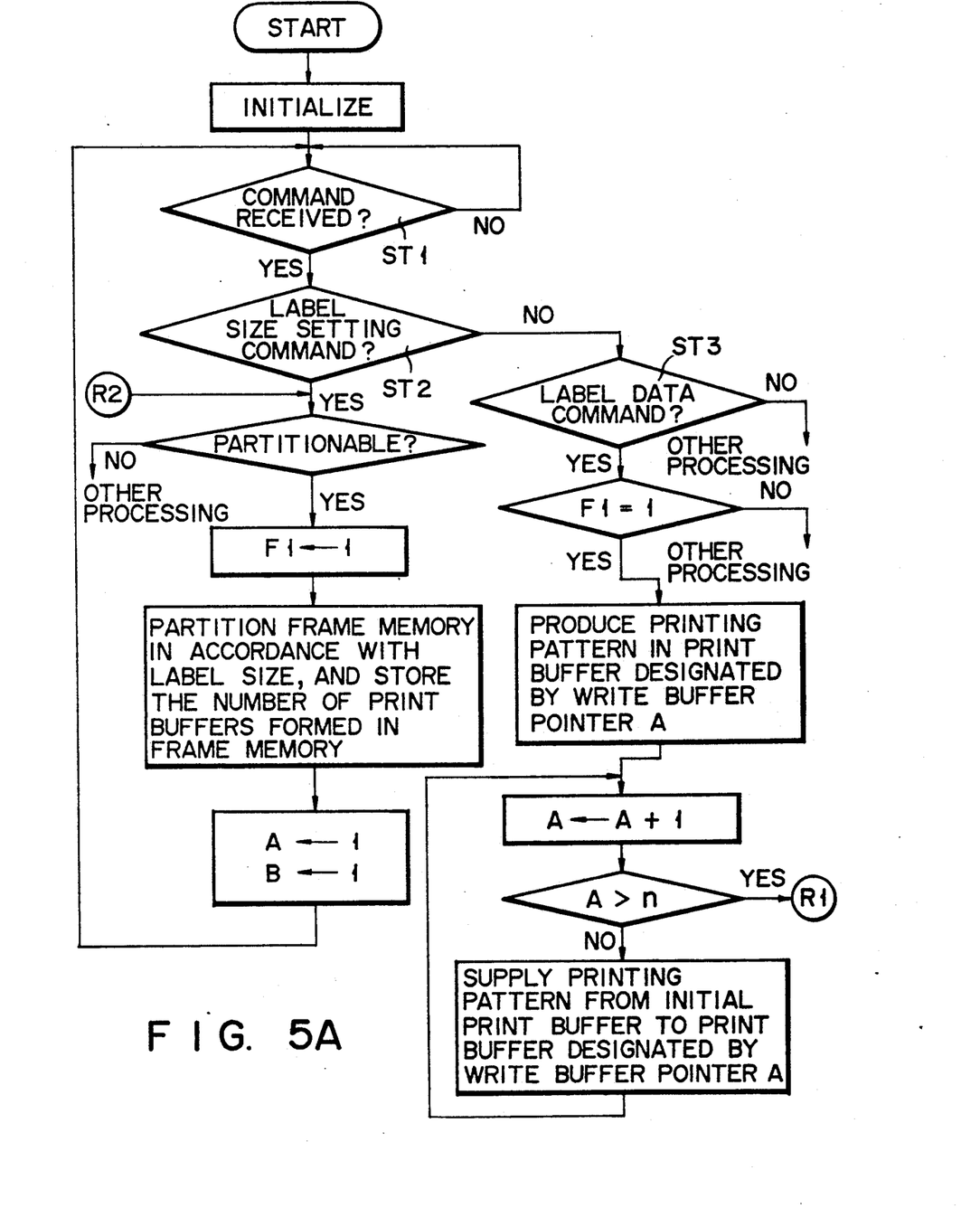
FIGS. 5A and 5B are views to illustrate the operations of the label printer of FIG. 1.
Figure 5B:
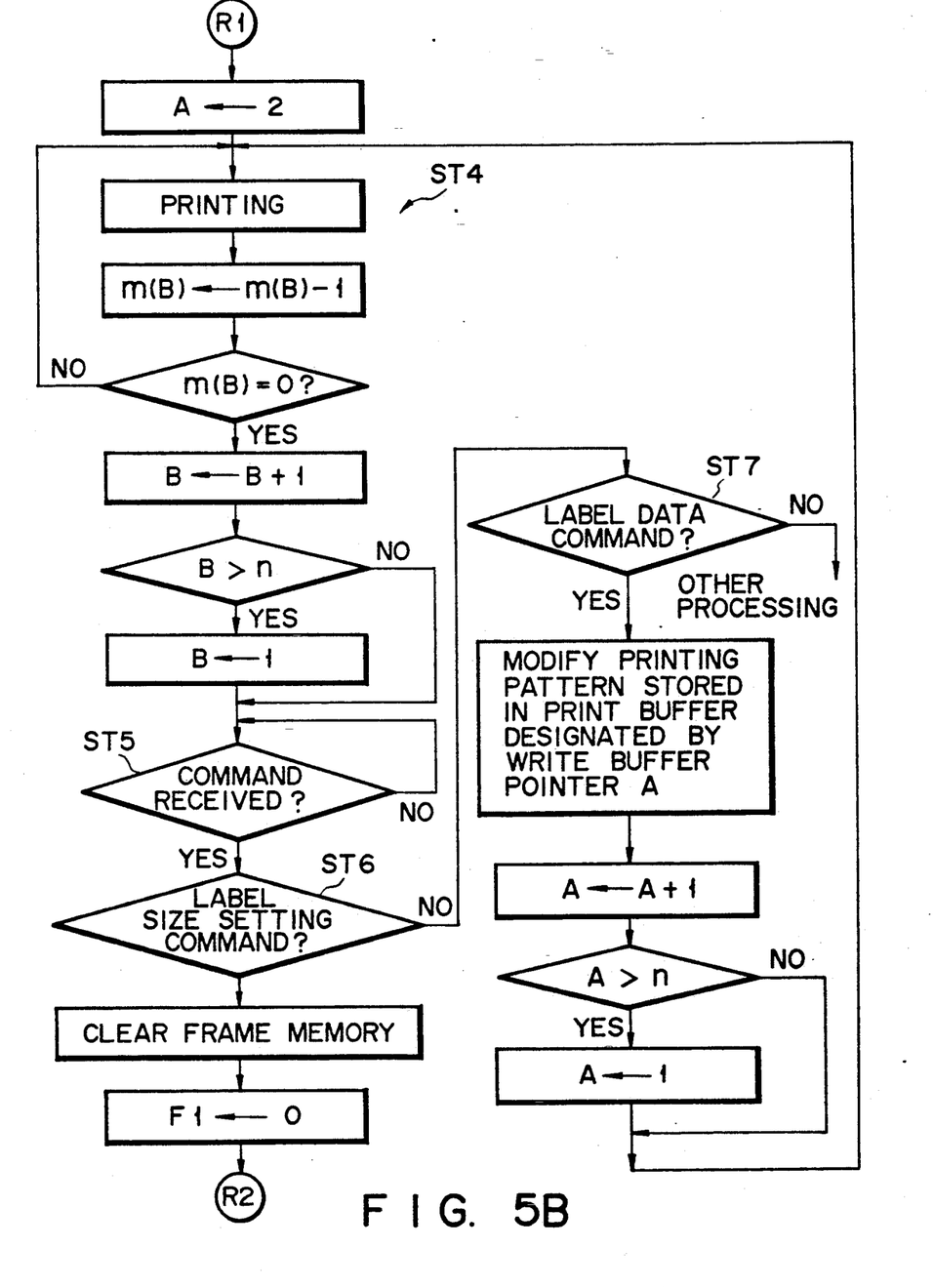

When the label printer is switched on, the CPU 1 executes the control program stored in ROM 3 to perform an operation shown in FIGS. 5A and 5B. As the operation starts, the communication interface 5, RAM 4, frame memory 8, etc. are initialized. When it is detected that a command has been received from the host computer HC via the communication interface 5 in step ST1, the type of the command is checked. If the received command is detected to be a label size setting command in step ST2, it is checked whether or not the frame memory 8 can be partitioned to provide a plurality of printing buffers, according to the label size setting command. In the affirmative, a partition flag "1" is set in a flag register F1 and a plurality of print buffers, for example, three print buffers PB1, PB2 and PB3 are accommodated in the frame memory 8. The number of the print buffers, here 3, is stored in the number-of-buffers memory n. Then, "1" is set in the write buffer pointer A and the read buffer pointer B. Upon completion of this procedure, step ST1 is again executed.

On the other hand, when the command received is detected in step ST2 not to be a label size setting command, but detected in step ST3 to be a label data command, then the partition flag register F1 is sought. If the partition flag register F1 is set at "1", then a printing pattern is produced in the print buffer PB1, which is designated by the write buffer pointer A, by converting print data for one label contained in the label data command into character or bar code patterns by means of the pattern generator, and then storing the patterns into a print buffer PB1, according to a printing format previously designated by the format command.

After storing the printing pattern in the print buffer PB1, the write buffer pointer A is incremented by one, and the printing pattern stored in the print buffer PB1 is transferred into the next print buffer PB2 designated by the write buffer pointer A. The write buffer pointer A is successively incremented by one, and the transfer of the printing pattern is repeated till the value in pointer A reaches that in the number-of-buffers memory n. If the printing pattern stored in the first print buffer PB1 is detected to have been stored in all remaining print buffers PB2 and PB3 by comparing the values of the write buffer pointer A and the number-of-buffers memory n, "2" is set in the write buffer pointer A.

Next, in step ST4, a printing pattern is read from the print buffer designated by the buffer pointer B, namely the first print buffer PB1 and fed to the head driver circuit 10. At the same time, a grant to drive the dot printing head 9 is given to the driver circuit 10, whereby labels are printed in the number set in the number-of-issues memory m1. Thereafter, the read buffer pointer commands concerning a label size setting command.

B is incremented by one. If the value in the pointer B exceeds that in the number-of-buffers memory n, "1" is set in the pointer B again.

After start of label printing, a command for the next label is received via the communications interface 5. When it is confirmed in step ST5 that the command has been stored in the reception buffer RB, step ST6 is executed to check whether or not the received command is a label size setting command. If the received command is found to be a label size setting command, the frame memory 8 and partition flag register F1 is cleared upon completion of the label printing. Thereafter, checking whether or not the frame memory 8 can be partitioned to provide a plurality of printing buffers is resumed.

If the received command is detected not to be a label size setting command in step ST6, but to be a label data command in step ST7, then print data contained in the label data command are converted into character or bar code patterns by using the pattern generator and stored into the print buffer PB designated by the write buffer pointer A, as a modification pattern. Since the label data command for the next label does not contain print data identical to those contained in the label data command for the initial label, the printing pattern pre-stored in the print buffer PB2 is partly rewritten for printing of the next label.

After modification of the printing pattern, the write buffer pointer A is incremented by one. The incrementation takes place after printing of a preceding label if the print is still being performed. If the value of the pointer A exceeds the number n of the print buffers, the pointer A is reset to "1".

Thereafter, step ST4 is again executed to print the printing pattern stored in the print buffer designated by the pointer B, i.e., the print buffer PB2. After printing, the read pointer B is incremented. If the next label data command is received by then, the contents of a print buffer designated by the buffer pointer A is rewritten in the manner above mentioned. Label printing and printing pattern production are repeated till another label size setting command is received. If this command is received, the frame memory 8 is cleared and print buffers in the number equal to the label size are again provided in the frame memory 8 as already mentioned.

Where a label size designated by the label size setting command is too large to provide a plurality of print buffers in the frame memory, a single print buffer is provided by the partitioning.

Figure 6A:
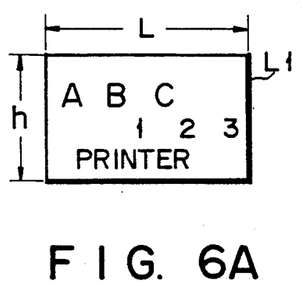
FIGS. 6A to 6C show examples of a different label printed by the.label printer shown in FIG. 1.
Figure 6B:
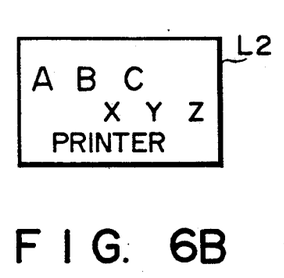
Figure 6C:
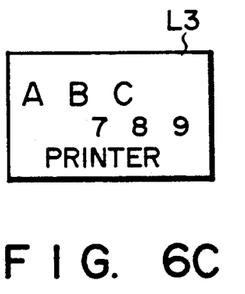

With the construction of the embodiment, the operation of printing three labels L1, L2, L3 of the same size and of a partly differing printing pattern as shown in FIGS. 6A to 6C will be described. It is assumed that the size of the labels L1, L2, L3 is within the range from ¼ to ⅓ of the total storage capacity of the frame memory 8.

Figure 7A:
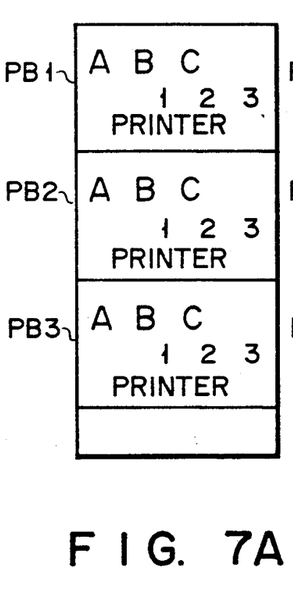
FIGS. 7A to 7C are views giving changes in printing patterns stored in a first to third print buffers shown in FIG. 2.

To determine a label size common to the labels L1–L3, the host computer HC first transmits a label size setting command to the label printer. On reception, print buffers PB1, PB2, PB3 are allocated in the frame memory as shown in FIG. 3. Label data commands for the labels L1–L3 are successively transferred from the host computer HC. On reception of a label data command for the label L1, a printing pattern is formulated in the print buffer PB1 based o print data contained in this command. The label data command for the label L1 contains print data for character strings "ABC", "123" and "PRINTER". The formulated printing pattern is read out from the print buffer PB1 and stored into each of the print buffers PB2 and PB3. FIG. 7A illustrates printing patterns stored in the print buffers PB1, PB2, PB3.

Figure 7B:
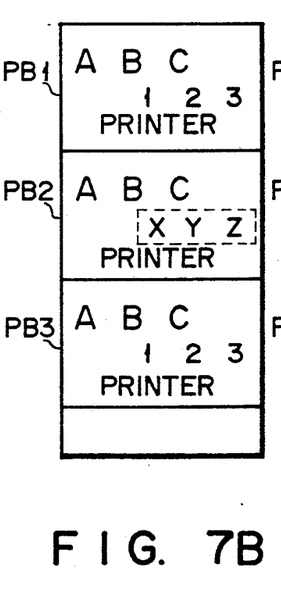

Thereafter, the printing pattern stored in the print buffer PB1 is read out and supplied to the dot printing head 9, whereupon the printing head 9 performs printing to produce a label L1 as shown in FIG. 6A. During printing, a label data command for the next label L2 is received and a modification pattern is generated on the basis of print data contained in the command to rewrite the print data stored in the print buffer PB2. The label data command for the label L2 contains print data for a character string "XYZ", but does not contain print data for character strings "ABC" and "PRINTER". A printing pattern thus rewritten for the label L2 is shown in FIG. 7B. The printing pattern stored in the print buffer PB2 is read out promptly upon termination of printing the label L1 and supplied to the printing head 9, whereby the label L2 is printed by the printing head 9 as shown in FIG. 6B.

Figure 7C:
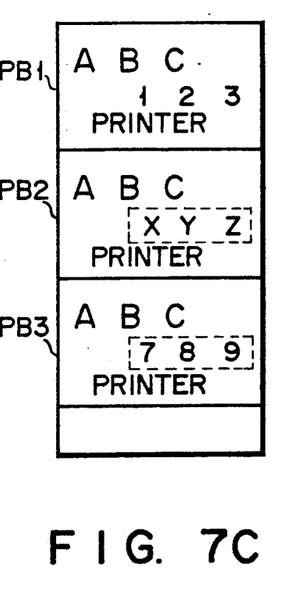

During printing of the label L2, a label data command for the label L3 is received allowing a modification pattern to be formulated from print data contained therein to rewrite the printing pattern contained in the print buffer PB3. The label data command for the label L3 contains print data for a character string "789", but does not contain print data for character strings "ABC" and "PRINTER". Shown in FIG. 7C is the printing pattern for the label L3 thus rewritten. The printing pattern stored in the print buffer PB3 is read out immediately after completion of a printing operation for the label L2 and fed to the printing head 9, whereby the label L3 is printed out by the printing head 9 in the form shown in FIG. 6C.

Figure 8:
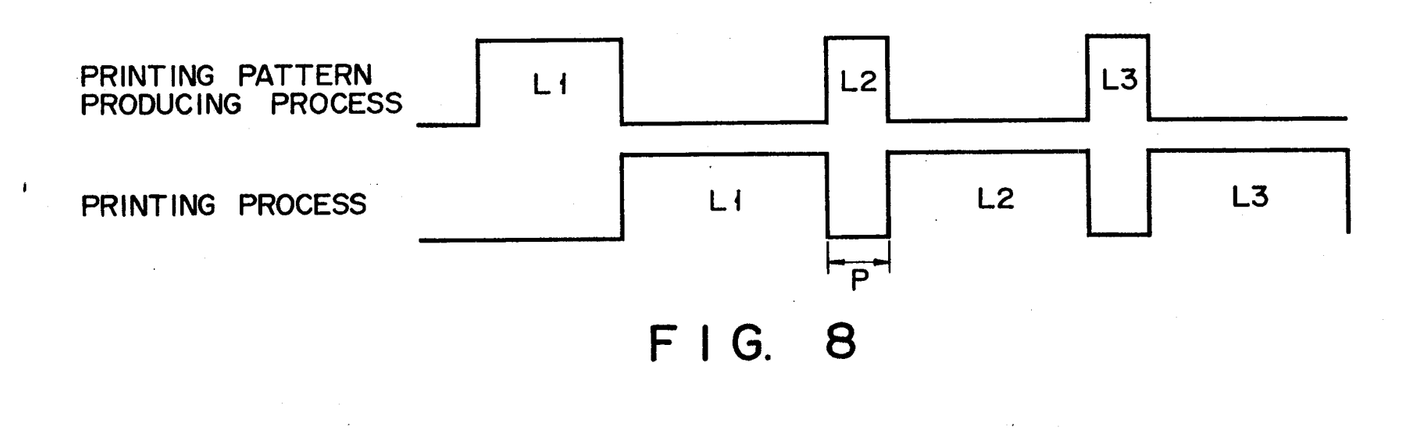
FIGS. 8 and 9 are views to explain print preparatory period that is shortened according to the embodiment, FIG. 8 showing a combination, in relation to time, of printing pattern producing process and printing process according to a known label printer, and FIG. 9 being a view similar to FIG. 8 but according to the label printer shown in FIG. 1.
Figure 9:
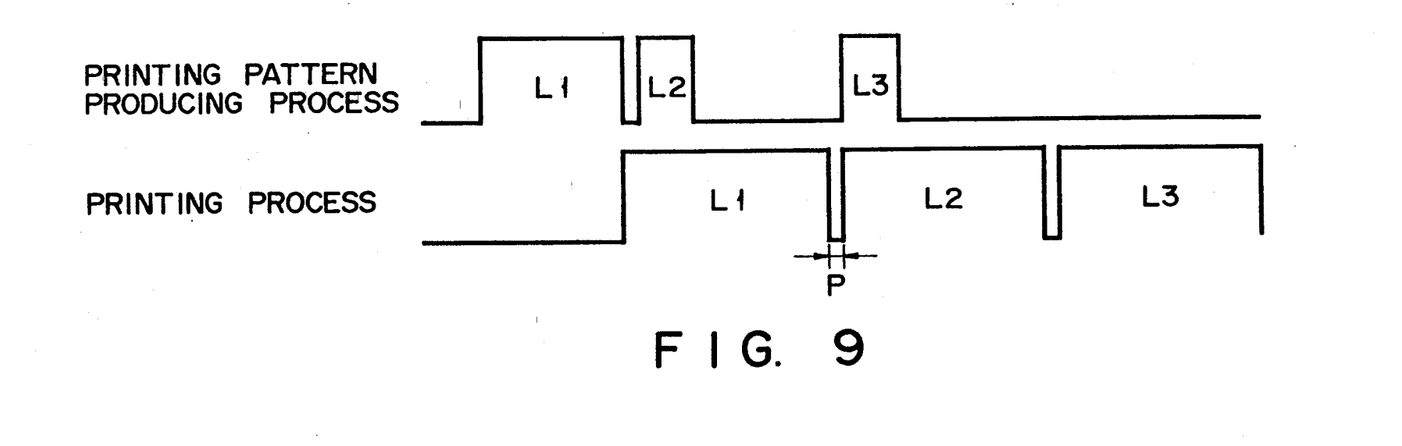

In issuing the three labels L1–L3 by using a known label printer, the printing pattern producing process and the printing process are combined in relation to time as seen in FIG. 8. In contrast, in the label printer of the foregoing embodiment, those are combined as shown in FIG. 9. A known label printer is incapable of starting printing pattern producing process for a succeeding label until the termination of printing process for a preceding label. This embodiment permits the printing pattern producing process for a succeeding label to take place during the printing process for a preceding label. For this reason, a print preparatory time period P for succeeding labels can be greatly shortened attaining a high speed operation for continuously issuing labels of different contents and yet improving the efficiency of label issuing work.

In the foregoing embodiment, once the printing pattern for the first label L1 has been produced in the print buffer PB1, the printing pattern is copied on all of the remaining print buffers PB2 and PB3. The pattern stored in the print buffer PB1, however, may be first copied on the print buffer PB2, and the pattern stored in the print buffer PB2 may in turn be copied on the buffer PB3 and onwards. In this case, the printing pattern stored in the print buffer PB2 may be copied on the print buffer PB3 after the modification for printing the label L2.

Still further, in the foregoing embodiment, the description has been directed to an example where three different kinds of labels are issued by using the print buffers PB1 to PB3 provided in the frame memory 8. It should be appreciated, however, that the label printer of the embodiment may issue four or more different kinds of labels by using the print buffers PB1 to PB3 if their sizes are common to all. For instance, a printing pattern for a fourth label may be obtained by rewriting the printing pattern stored in the print buffer PB1 with a modification pattern generated on the basis of print data differing from that for the label L1.

Moreover, in the above embodiment, a series of label paper attached to a base sheet are used. Therefore, each label paper is removed from the base sheet and attached to an article. However, separate sheets of label paper may be used in a case where the labels are issued as a tag.

Additional embodiments of the present invention will be apparent to those skilled in the art from consideration of the specification and practice of the present invention disclosed herein. It is intended that the specification and the embodiment be considered exemplary only, with the true scope of the present invention being indicated by the following claims.

What is claimed is:

1. A label printer comprising:
   memory means for storing a printing pattern for a label to be printed;
   printing means for printing a label in accordance with the printing pattern stored in said memory means; and control means including partitioning means for partitioning said memory means in accordance with a designated size of the label, thereby providing at least one print buffer in said memory means, for producing a printing pattern for one label in the at least one print buffer, and for supplying the printing pattern stored in the at least one print buffer to said printing means;

said control means including a modifying section including means responsive to a plurality of print buffers being provided in said memory means, for transferring the printing pattern produced in one of the print buffers into a remaining print buffer and for modifying the printing pattern stored in a remaining print buffer to produce another printing pattern;

said modifying section further including:
means for producing a modification pattern in a remaining print buffer from print data for a different part from that of the printing pattern pre-stored in the remaining print buffer; and
means for permitting said producing means to produce the modification pattern while the printing means prints a label in accordance with the printing pattern supplied from said one print buffer; and said partitioning means of said control means including means for partition said memory means in response to a label size setting command; and said partitioning means further including a first pointer for designating a print buffer for use in writing and a second pointer for designating a print buffer for use in reading.

2. The label printer of claim 1, wherein said modifying section further includes means for transferring the printing pattern produced in said one print buffer into all of the remaining print buffers.

3. The label printer of claim 2, wherein said modifying section further includes means for determining a number of labels to be issued for each printing pattern.

4. A printer comprising:
memory means for storing at least one print pattern of a designated frame size;
printing means for printing a slip in accordance with the at least one print pattern stored in said memory means; and
processing means for partitioning said memory means to have one or more print buffers the total number of which is determined by the frame size, and for producing a print pattern in one print buffer;
said processing means including updating means which is enabled when said memory means is partitioned into a plurality of print buffers and a print pattern is produced in one of the print buffers, for duplicating the print pattern stored in one print buffer into another print buffer and for modifying part of the print pattern stored in said other print buffer to produce another print pattern different from the pattern stored in said one print buffer.

5. The printer of claim 4, wherein said processing means further includes means for receiving print data defining a print pattern and a size setting command designating a frame size.

6. The printer of claim 5, wherein said updating means includes means for producing a modification pattern from print data the amount of which is less than that required for defining a print pattern to be originally produced, and for substituting the modification pattern for part of the print pattern stored in said other print buffer.

7. The printer of claim 6, wherein said processing means further includes control means for controlling said printing means and said updating means to operate in parallel.

8. The printer of claim 7, wherein said processing means further includes means for regarding as an available buffer a print buffer storing a print pattern which has already been printed by the printing means and is no longer being used.

9. The printer of claim 8, wherein said control means includes:
a first pointer means for designating a print buffer for use in production of a print pattern; and
a second pointer means for designating a print buffer storing a pattern which can be printed by said printing means.

10. The printer of claim 9, wherein said updating means includes means for duplicating the print pattern stored in said one print buffer into all other print buffers.

11. The printer of claim 10, wherein said processing means further includes means for determining a number of slips to be printed in each print pattern.

12. The printer of claim 4, wherein said processing means further includes control means for controlling said printing means and said updating means to operate in parallel.

13. The printer of claim 4, wherein said processing means further includes means for regarding as an available buffer a print buffer storing a print pattern which has already bene printed by the printing means and is no longer being used.

14. The printer of claim 12, wherein said control means includes:
a first pointer means for designating a print buffer for use in production of a print pattern; and
a second pointer means for designating a print buffer storing a pattern which can be printed by said printing means.

15. The printer of claim 4, wherein said updating means includes means for duplicating the print pattern stored in said one print buffer into all other print buffers.

16. The printer of claim 4, wherein said processing means further includes means for determining a number of slips to be printed for each print pattern.

* * * * *